United States Patent
Leino et al.

(10) Patent No.: US 7,024,661 B2
(45) Date of Patent: Apr. 4, 2006

(54) SYSTEM AND METHOD FOR VERIFYING COMPUTER PROGRAM CORRECTNESS AND PROVIDING RECOVERABLE EXECUTION TRACE INFORMATION

(75) Inventors: K. Rustan M. Leino, Sunnyvale, CA (US); Todd David Millstein, Seattle, WA (US); James B. Saxe, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1081 days.

(21) Appl. No.: 09/754,890

(22) Filed: Jan. 5, 2001

(65) Prior Publication Data

US 2002/0046393 A1    Apr. 18, 2002

Related U.S. Application Data

(60) Provisional application No. 60/174,952, filed on Jan. 7, 2000.

(51) Int. Cl.
  *G06F 9/44* (2006.01)
(52) U.S. Cl. .................................. 717/126; 714/38
(58) Field of Classification Search ............... 717/126, 717/127, 128, 134, 135, 131, 132, 146; 714/38
  See application file for complete search history.

(56) References Cited

U.S. PATENT DOCUMENTS

| 4,920,538 | A | * | 4/1990 | Chan et al. | 714/38 |
|---|---|---|---|---|---|
| 5,694,539 | A | * | 12/1997 | Haley et al. | 717/135 |
| 5,854,924 | A | * | 12/1998 | Rickel et al. | 717/132 |
| 5,909,580 | A | * | 6/1999 | Crelier et al. | 717/131 |
| 5,987,252 | A |  | 11/1999 | Leino et al. | 717/126 |
| 6,029,002 | A | * | 2/2000 | Afifi et al. | 717/131 |
| 6,128,774 | A | * | 10/2000 | Necula et al. | 717/126 |
| 6,374,368 | B1 | * | 4/2002 | Mitchell et al. | 717/132 |
| 6,560,774 | B1 | * | 5/2003 | Gordon et al. | 717/146 |

OTHER PUBLICATIONS

"A Generalization of Dijkstra's Calculus"; Greg Nelson; Digital Systems Research Center; Apr. 2, 1987; #16; 57 pages.

"Ecstatic: An object-oriented programming language with an axiomatic semantics"; K. Rustan M. Leino; Digital Equipment Corporation Systems Research Center; Dec. 16, 1996; KRML 65-0; 42 pages.

"Extended Static Checking"; David L. Detlefs et al.; Compaq Systems Research Center; Dec. 18, 1998, #159; 44 pages.

(Continued)

*Primary Examiner*—Tuan Dam
*Assistant Examiner*—Michael Yigdall (57) ABSTRACT

In a system for statically analyzing a specified computer, a verification condition generator converts the program into a logical equation, called a verification condition, and inserts program flow control labels into the sub-equations of the verification condition. The flow control labels identify conditional branch points in the specified computer program. A theorem prover is applied to the logical equation to determine truth of the logical equation, and when the truth of the logical equation cannot be proved, the theorem prover generates at least one counter-example identifying one of the conditions, one or more variable values inconsistent with that condition, and any of the flow control labels for conditional branch points of the program associated with the identified variable values. A post processing module converts each counter-example into an error message that includes a program trace when the counter-example identifies one or more of the flow control labels.

47 Claims, 3 Drawing Sheets

OTHER PUBLICATIONS

"Checking Java programs via guarded commands"; Compaq Systems Research Center; May 21, 1999; SRC Technical Note 1999-002 ; 6 pages.

Detlefs, David L. "*An Overview Of The Extended Static Checking System*" Digital Equipment Corporation, Systems Research Center, 130 Lytton Ave, Palo Alto CA 94301, (Nov. 28, 1995), pp 1-9.

Intrinsa Corp. "*A Technical Introduction To PREfix/ Enterprise*" (1998) pp 1-18.

Janssen et al. "*Model Checking For Managers*" Proceedings of the 6th International SPIN Workshop On Practical Aspects Of Model Checking, Toulouse, France, (Sep. 1999), pp 1-16.

Manasse et al. . "*Correct Compilation Of Control Structures*" AT&T Bell Laboratories, Murral Hill, New Jersey 07974, (Apr. 13, 1985), pp 1-20.

Millstein, Todd "*Toward More Informative ESC/JAVA Warning Messages*" http://gatekeeper.research.compaq.com/pu... 1-notes/src-1999-003-html/millstein.html, pp 1-2. Last Accessed on Nov. 21, 2001.

Rustan et al. "*ESC/Java User's Manual*" SRC Technical Note 2000-002, (Oct. 12, 2000), pp 1-92.

Leino, K. R. M. and Nelson, C. G., "*An extended static checker for Modula-3*", in Kai Koskimies, Ed., *Compiler Construction: 7th International Conference*, Apr. 1998 (CC'98), *Lecture Notes in Computer Science*, vol. 1383, pp. 302-305, (Springer-Verlag 1998).

Savage et al. "*Eraser: A Dynamic Data Race Detector For Multi-Threaded Programs*" ACM Transactions On Computer Systems, (Nov. 1997), V15 No. 4, pp 391-411.

* cited by examiner

SYSTEM AND METHOD FOR VERIFYING COMPUTER PROGRAM CORRECTNESS AND PROVIDING RECOVERABLE EXECUTION TRACE INFORMATION

This application claims priority on U.S. provisional patent application No. 60/174,952, filed Jan. 7, 2000.

FIELD OF THE INVENTION

The present invention relates generally to tools that automatically verify, using static checking techniques, the correctness of a computer program with respect to predefined criteria, and particularly to a tool that derives verification conditions that are annotated in a way that enables the tool to indicate a specific sequence of program instructions associated with potential programming errors detected by the tool.

BACKGROUND OF THE INVENTION

The purpose of a computer program verification system is to analyze a given computer program to determine whether or not it has certain desirable properties. Verification systems can also be used to analyze hardware components, formulae, algorithms, or, more generally, behavioral designs.

A typical verification system works by generating a verification condition (VC) from a given behavioral design, and then processing the verification condition with a theorem prover. A verification condition is a logical formula that, ideally, is valid if and only if all possible behaviors of the design have the desirable properties under consideration. In practice, the verification condition generated may be only an approximation of the ideal verification condition.

The theorem prover should have the property that when it fails to generate a proof, it generates a number of potential counter-examples. The verification system then post-processes these counter-examples into warnings that the desirable properties may not hold. A warning may be spurious; that is, it may warn about something that is not a real error. Spurious warnings may arise when the theorem prover does not have enough information to generate a proof, when the prover is too weak a prover to automatically generate a proof, or when the verification condition produced is not quite the ideal one.

A good verification system has the property that the warnings it produces are informative and easy for a designer to understand. If a warning message is informative and easy to understand, the designer can more easily determine whether a warning is real or spurious, and what its cause is. The designer can then act accordingly, correcting the design at the source of the problem, or ignoring the warning, possibly annotating the design so that the warning will be suppressed next time the verification system is run.

An informative warning message should, ideally, include a characterization of the possible defect (e.g., "array index of out bounds", "timing constraint not satisfied", "race condition", "deadlock", "failure to establish invariant") and a source location in the behavioral design where the verification system tried, but failed, to show the absence of the defect (e.g., "line 218 of file 'ABC.source'"). However, because behavioral designs can include many behaviors that lead to a given source location, a warning message would be even more informative if it provided the sequence or set of behavioral aspects or steps that occur in the scenario of the reported defect, i.e., a program trace. Such behavioral aspects or steps are akin to an execution trace.

There is a class of authoring tools that performs verification functions and generates execution traces. These tools are called dynamic or run-time checkers, because they execute or simulate the execution of the behavioral design in question (i.e., the computer program) and output the active path at the time a possible defect is detected. Examples of such tools are PREfix (Intrinsa Corp., (1998)), which symbolically executes the given program, Testbed Studio, which uses an underlying model checker to perform an exhaustive, back-tracking symbolic simulation of a representation of a given design, and Eraser (Savage, S., et al., "Eraser: A Dynamic Data Race Detector for Multi-threaded Programs", ACM Transactions on Computer Systems (TOCS), 15(4): 391–411, November 1997. Also appeared in Proceedings of the Sixteenth ACM Symposium on Operating System Principles, Oct. 5–8, 1997, St. Malo, France, Operating System Review 31(5), ACM Press, 1997, ISBN 0-89791-916-5, pp 27–37.), which works as the program is actually being executed. In general, run-time checkers entail a number of disadvantages: there may be an overhead to their use, i.e., the program to be checked may be very intensive of resources; some errors in the program may only manifest themselves under certain run-time conditions, such as certain values of the initial parameters; and some errors may be non-reproducible.

By contrast, the present invention falls within a class of program verifiers known as static checkers. Static checkers catch errors at compile time without simulating or executing the program. A research project based on this strategy, the Extended Static Checker (ESC) has been implemented using the technology of program verification. With the ESC, as with static checkers generally, the behavioral design has been annotated by a developer so that the verification condition contains entries associated with specific positions in the source code of the program. The ESC represents a compromise between the rigorous demands of complete program verification and the limited utility of traditional static checkers. Use of a static checker can be important because the cost of a programming error can be greatly reduced if it is detected early in the development process.

Whereas hitherto, static checkers have been successful in pointing out specific source locations where errors or potential errors arise, their applicability has been limited in part because the designer must still ascertain the path that the program took to the error. Accordingly, it is an object of the present invention to cause a static checker to produce program traces that illustrate the possible run-time conditions (e.g., variable values and program execution path) that give rise to the error.

SUMMARY OF THE INVENTION

The present invention is a system and method for statically analyzing a specified computer program. A verification condition generator converts the program into a logical equation called a verification condition, and inserts program flow control labels into sub-equations of the verification condition. The flow control labels identify conditional branch points in the specified computer program. In a preferred embodiment, the computer program is converted into an intermediate language form before being converted into the logical equation.

In a preferred embodiment, at least one of the flow control labels is of the form {LBLPOS L P} or {LBLPOS L True}==>P wherein L is a flow control label name. In another embodiment, at least one of the flow control labels is of the form L==>P or is of the form L=k==>P wherein L is a flow control label name, k is a constant value and P is a subcomponent of the verification condition. In a further preferred embodiment, the flow control label name comprises a string that identifies the type of branch in the program, a line number in the specified computer program and, optionally, a column number on the line number.

A theorem prover is applied to the logical equation to determine the truth of the logical equation, and when the truth of the logical equation cannot be proved, the theorem prover generates at least one counter-example identifying a verification sub-condition (which corresponds to a desired program behavior), one or more variable values inconsistent with the verification sub-condition, and any of the flow control labels for conditional branch points of the program that direct the program to produce the identified variable values.

A post processing module converts each counter-example into an error message that includes a program trace when the counter-example identifies one or more of the flow control labels.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
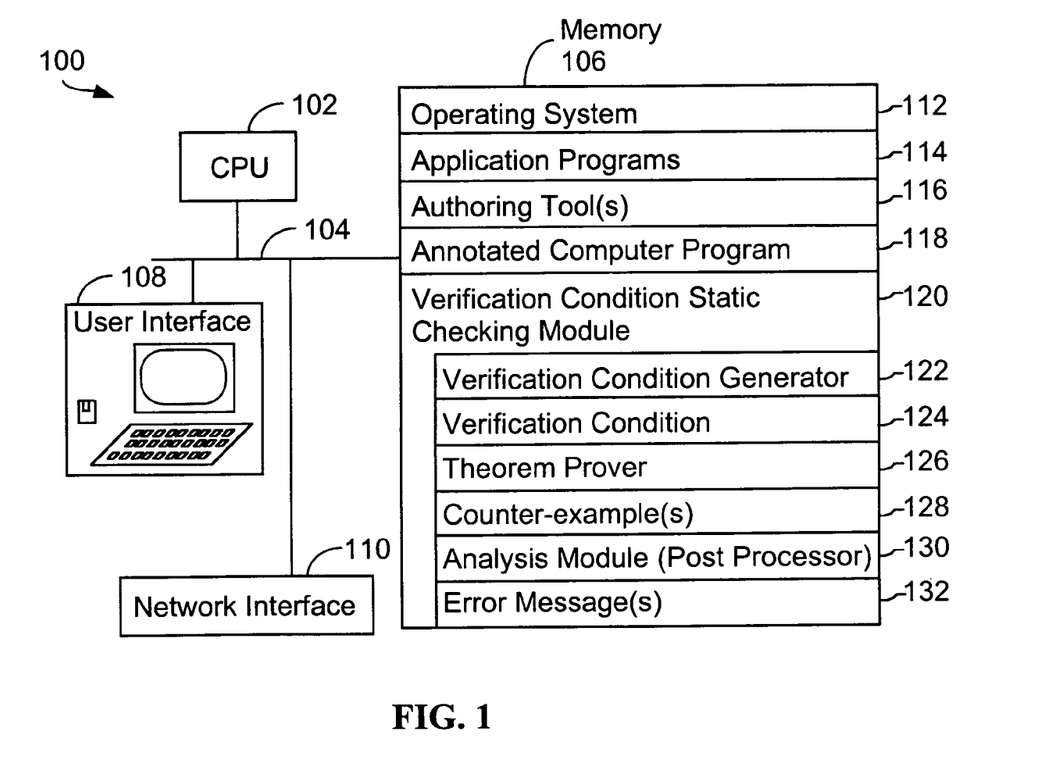
FIG. 1 is a block diagram a of a programmed general purpose computer according to an embodiment of the Verification Condition Static Checking system.

Referring to FIG. 1, the present invention may be implemented using a programmed general-purpose computer system 100. The computer system 100 includes: (a) one or more data processing units (CPU's) 102; (b) memory 106, which will typically include both high speed random access memory as well as non-volatile memory (such as one or more magnetic disk drives); (c) a user interface 108; (d) a network or other communication interface 110 for communicating with other computers as well as other devices; and (e) one or more communication busses 104 for interconnecting the CPU(s) 102, memory 106, user interface 108, and network interface 110.

The computer system's memory 106 stores procedures and data, typically including:
- an operating system 112 for providing basic system services;
- application programs 114, such as user level programs for viewing and manipulating images;
- authoring tools 116, for assisting with the writing of computer programs; and
- an annotated computer program 118, representing a computer program to be analyzed by a verification condition static checking system 120.

The verification condition static checking system 120 preferably includes:

- a verification condition generator 122, which generates as its output a verification condition 124;
- a theorem prover 126 that analyzes the verification condition and generates one or more counter-examples 128 when it is unable to prove the verification condition; and
- an analysis module 130 that performs post processing on the counter-examples generated by the theorem prover 126, and when an error or potential error in the computer program 118 is detected, produces one or more error messages 132.

The present invention has been implemented for the language Java in a research project at Compaq called ESC/Java. See, for example, Leino, K. R. M., et al., "ESC/Java User's Manual", SRC Technical Note 2000-002, Compaq Computer Corporation Systems Research Center, October 2000, also available at http://gatekeeper.dec.com/pub/DEC/SRC/technical-notes/SRC-2000-002.html.

ESC/Java performs modular checking: it can be used to check selected modules of a program without checking the entire program. This aspect facilitates use of ESC/Java with programs that rely on libraries. ESC/Java also permits checking for selected classes of errors: for example it is possible to check for deadlocks and race conditions without checking for array index bounds errors.

The present invention is used much in the same way as a type checker or like the C tool lint so that its warnings are of greatest meaning to the author of the program being checked.

Overview of the Method of the Present Invention

Figure 2:
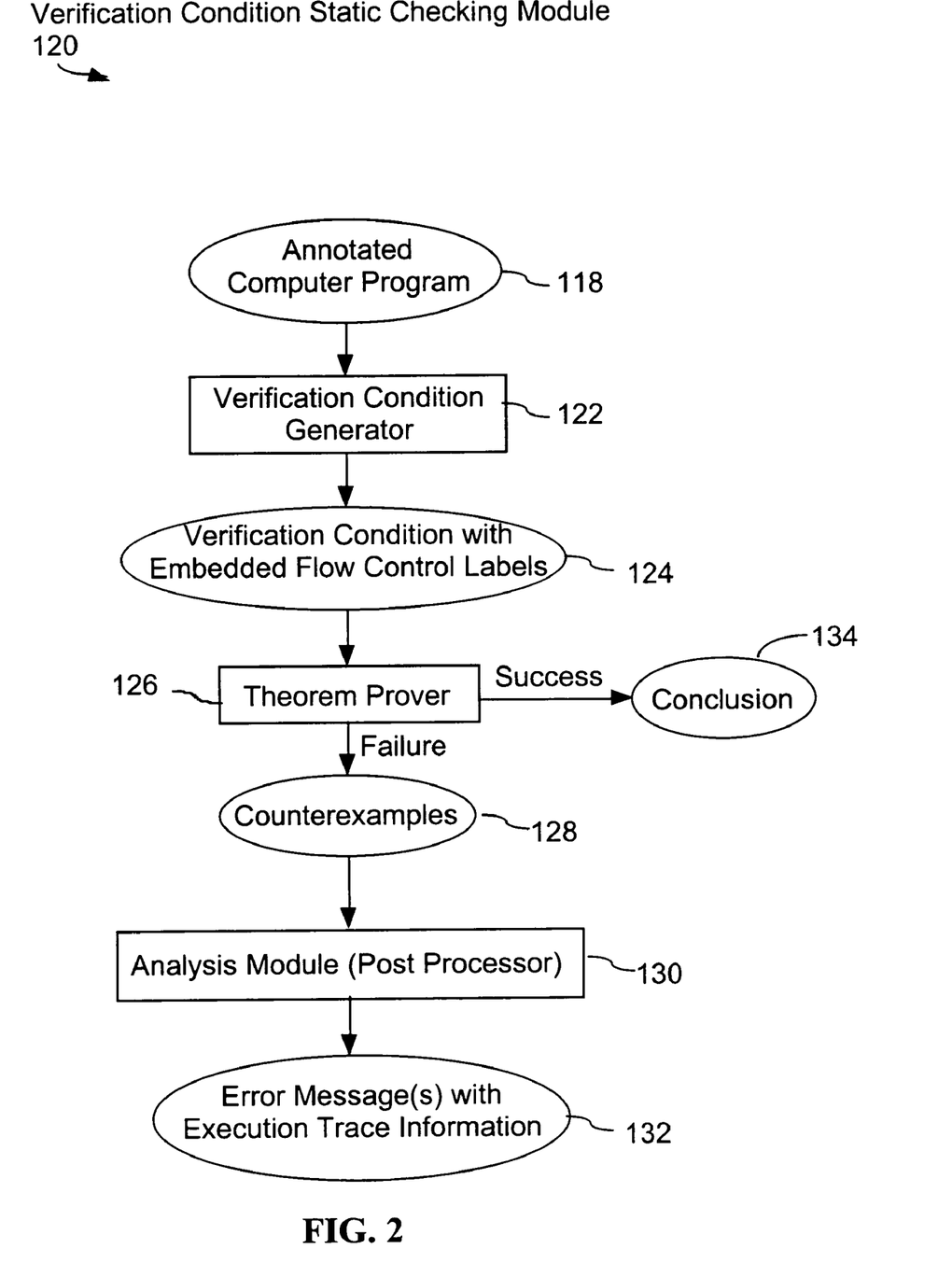
FIG. 2 is a flow chart showing the application of a verification condition static checking module to an annotated computer program.

The operation of a preferred embodiment of the present invention is described with reference to FIG. 2. The annotated program 118, or behavioral design, to be checked is first processed by the verification condition generator 122. For a description concerning verification condition generation see K. Rustan M. Leino, "Ecstatic: An object-oriented programming language with an axiomatic semantics," Proceedings of the Fourth International Workshop on Foundations of Object-Oriented Languages, January 1997; and K. Rustan M. Leino, James B. Saxe, and Raymie Stata, "Checking Java programs via guarded commands," Technical Note 1999-002, Compaq Systems Research Center, Palo Alto, Calif., May 1999.

The program annotations in the input program or design are supplied by the program developer or by an automatic annotation assistant, or both. VC annotations used with the present invention are described subsequently, and are distinct from program annotations. The verification condition generator 122 first converts the annotated program 118 to an intermediate programming language that facilitates analysis of the program, and then performs a second conversion to generate a "logical equation" that represents the verification condition (VC) 124 for the program. In a preferred embodiment, the intermediate programming language is a version of Dijkstra's guarded commands (Dijkstra, E. W., *A Discipline of Programming*, Prentice-Hall, (1976); see also, Nelson, G., "A Generalization of Dijkstra's Calculus", ACM Transactions on Programming Languages and Systems, 11(4):517–61, April 1989). The weakest precondition equations of Dijkstra are used to generate the VC. Alternate embodiments can utilize other logical rules, such as Hoare logic, to generate the VC (see Hoare, "An axiomatic basis for computer programming," Communications of the ACM, vol. 12, no. 10, pp. 576–580, 583, October 1969). It is within the scope of the present invention for the VC generator to convert the annotated program to the logical equation without using an intermediate programming language.

An important function of the VC generator 122 is to insert flow control labels into the translated form of the program, as will be discussed in more detail below. The verification condition includes embedded flow control labels, which are implemented in a preferred embodiment as the LBLPOS and LBLNEG labels discussed below and shown in Tables 7 and 9. The logical equation that is the verification condition is typically a long list of logical sub-equations. Various subsets and combinations of the sub-conditions must be conclusively proved to be true for all possible program conditions. For example, a VC may be expressed as $S \land T \land U$, where each of S, T and U is a sub-condition and $\land$ is the logical AND operator. Each of S, T and U comes separately from some component of the annotated program or its translated form. Each of S, T and U must separately be true in order for the VC to hold.

In another embodiment of the present invention, the VC is the starting point, that is, the invention need not go through the step of creating the VC, but instead inserts flow control labels directly into the VC.

The theorem prover is refutation-based: to prove a verification condition VC, the prover attempts to satisfy $\neg VC$, where $\neg$ is the logical negation operator, by finding sets of program conditions that cause VC to be false. Accordingly, the job of the theorem prover 126 is to symbolically evaluate the sub-equations of the verification condition, for all possible program conditions, to determine which ones (if any) it cannot conclusively prove to be true. In program verification, the failure to satisfy $\neg VC$ implies that the verification condition is valid and the program meets its specifications. Under these circumstances, as the theorem prover is unable to refute the verification condition, it exits and provides the user with a conclusion 134. Such an outcome does not necessarily mean that the program is entirely correct, it only implies that no errors in specified categories have been found. Other categories of errors are the programmer's responsibility. On the other hand, failure to prove any sub-equation to always be true means that one or more of the pre-conditions or post-conditions required for proper operation of the program is not satisfied, or may potentially not be satisfied (if the theorem prover is not able to prove the truth of a sub-equation, even though it is in fact true).

In the method of the present invention, because the program is being checked for a prescribed set of properties, the satisfaction of $\neg VC$ gives an error context for the original program. Accordingly, for each sub-equation whose truth cannot be proved and which is marked with a condition label, the theorem prover generates one or more counter-examples 128. A counter-example is typically a set of variable values that violates a specified one of the conditions required for proper operation of the program. Thus, a counter-example must identify the instruction or instruction element associated with a condition, the condition itself, and the set of variable values that cause the condition to be not true.

When using the present invention, a counter-example may also include one or more flow control labels, which identify a path through the program that produces the variable values and error in the counter-example. In some circumstances, a counter-example may not include any flow control labels because all program paths can result in the variable values in the counter-example.

The counter-examples are passed to an analysis module 130, also called the post processor, which converts the counter-examples into error messages 132, including program trace information that identifies the path through the program required to produce the variable values in the counter-example. Typically, the variables in the counter-example are given names that are uniquely indicative of their location in the source. Such names facilitate analysis by the post-processor module 130. The post-processor 130 is preferably a parse-engine that recognizes flow control labels within the VC and extracts relationships between them.

VC Annotations (Flow Control Labels) Used by the Present Invention

The present invention generates a VC such that the post-processing of counter-examples obtained by attempting to refute the VC can produce informative warning messages. To be informative, the warning messages must be as specific as possible. The ability to identify a location in the source where an error arises is well known in the art, but the error messages produced are not as informative as one might wish because they do not reveal the path that the program would take to encounter the error.

Accordingly, the method of the present invention inserts information into the VC that does not change the validity of the VC, but is such that the presence or absence of parts of this information in a counter-example provides sufficient data from which to reconstruct one or more execution or program traces that may violate desirable properties. An execution trace of this sort is not one that is produced as the program runs, rather it is one that is deduced from the information presented in the counter-example.

The information in the VC that permits reconstruction of an execution trace may be introduced in a number of different ways. The information may derive from annotations, such as flow control labels, inserted into the behavioral design or computer program 118, from annotations introduced into the guarded command form of the program or from annotations put directly into the VC itself.

In a preferred embodiment, in order to use the execution tracing feature of the verification condition static checking module 120, the program to be analyzed is typically annotated to indicate program specific pre-conditions and post-conditions that are to be verified. Examples of such conditions are provided below. Other conditions that are not program specific, such as making sure that no instruction "dereferences" a null pointer and that no instruction accesses an array element outside the array's boundaries, may be automatically checked by the module 120, even without annotation of the program. Such automatic checks are often found within static checkers of the prior art and can typically be overridden with specific annotations. Providing annotations to override automatic checks is useful, for instance, when the verifier module generates an spurious warning message for a particular instruction or program element.

Figure 3:
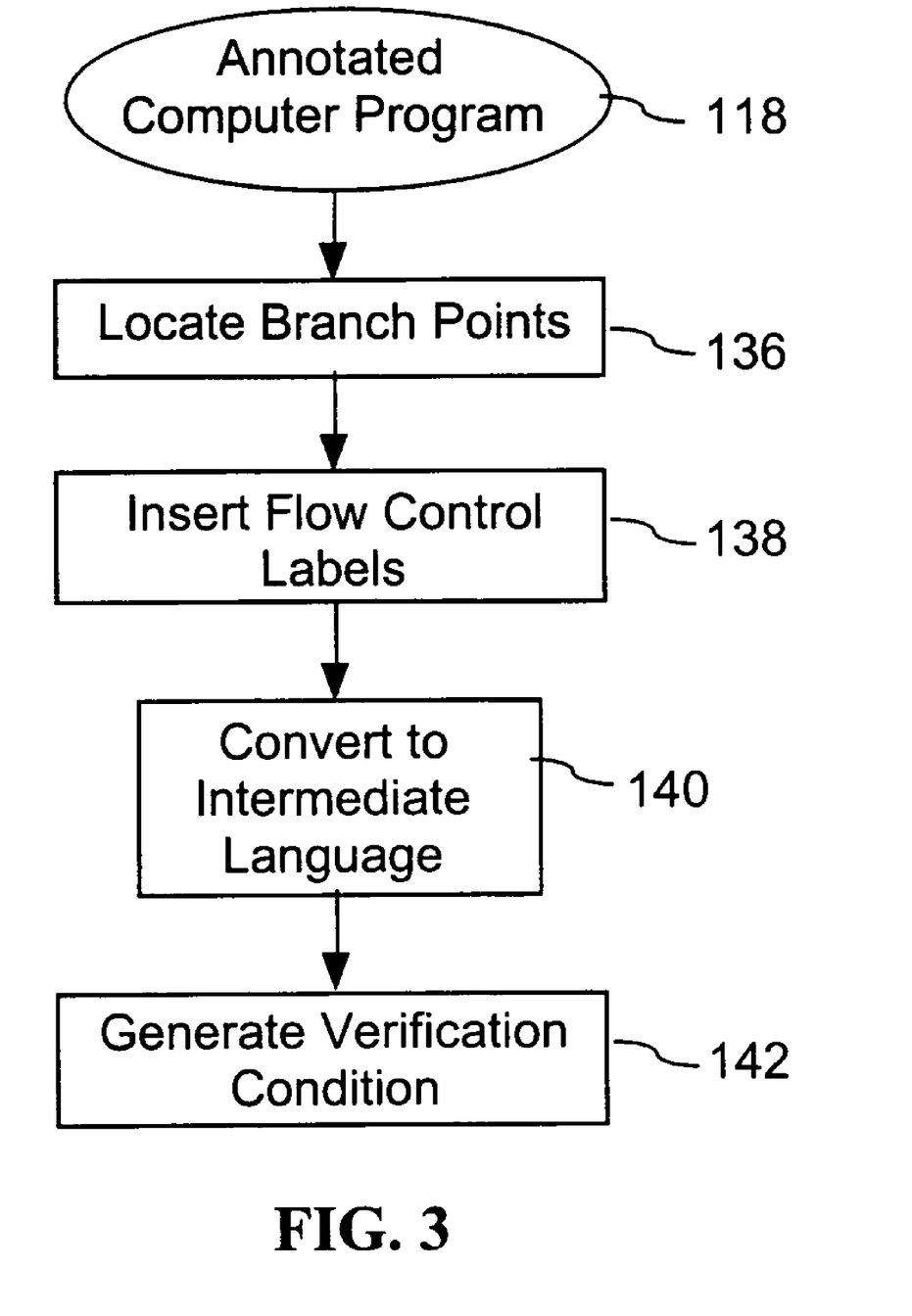
FIG. 3 is a flow chart showing the insertion of flow control labels into a computer program as part of the process of generating a verification condition for the computer program.

To implement the invention, as shown in FIG. 3, a "name" or label is associated with each subcomponent of the design to which a verification condition applies. A subcomponent is an instruction or a portion of an instruction. In particular, subcomponents that control the execution of an annotated program 118, such as conditional branch points, are identified, step 136. Flow control labels are inserted into the program, step 138 and persist when and if the program is converted to an intermediate language, step 140. Alternately, steps 136 and 138 are performed while converting the program into an intermediate language. A verification condition is then generated from the annotated program, step 142.

Ultimately, the aforementioned flow control labels are attached to the verification condition so that they will appear in the counter-example context whenever information about the instructions appears in the counter-example. In general, the VC has a structure that corresponds to the structure of the program. Examples of label names and the way in which they are used are given below.

A label name "L" can be attached to a portion "P" of a verification condition in one of a variety of ways. Four exemplary cases in which labels can be applied are as follows:

1. L==>P
2. L=k==>P
3. (LBLPOS L P)
4. (LBLPOS L true)==>P where: in the first case "L" is used as a predicate symbol; in case 2, "L" is used as the name of a variable and "k" is some constant or "L" itself; and in cases 3 and 4, "L" is used as a label. Logical equivalents of cases 3 and 4, using the LBLNEG construct, are: $\neg$(LBLNEG L $\neg$P), and $\neg$P==> (LBLNEG L false). Cases 1 and 2 work with most theorem provers that handle first-order predicate logic, whereas the labels "LBLNEG", and "LBLPOS" work only with provers that feature a mechanism by which a subexpression in the input can be labeled. (For instance, such labels are supported in Compaq's Simplify theorem prover, discussed at http://www.research.compaq.com/SRC/esc/Esc.html). The four cases are now discussed in further detail. It is noted here that many of the explanations provided within the separate discussions of the four cases are applicable to all four cases.

Case 1: L==>P

The first case can be described with reference to an exemplary program control structure, represented in pseudo-code as follows:

{If (Q) {A} else {B}}; C

To find whether this portion of code is always correct, the corresponding portion of the VC is the following mathematical formula:

(Q==>Correct (A; C)) $\wedge$ ($\neg$Q==>Correct (B; C))

where the implies (==>) operator has been used. The interpretation of this formula is: if Q holds, then A followed by C must both also be correct; but if Q does not hold, then B followed by C must both be correct. The formula can be simply represented as P$\wedge$R wherein P and R represent, respectively, the first and second subcomponents.

When the VC is tackled by the theorem prover, it is desirable to know whether a particular counter-example is associated with a particular branch in a control structure such as that shown above. Accordingly, names associated with subcomponents of the control structure are caused to appear within the counter-examples. By attaching a name, L, with subcomponent P of the formula, the subcomponent can itself be replaced by an expression of the form L==>P in the VC. For this device to work, L must be a predicate whose name has not been used elsewhere within the VC. For some theorem provers, it may be necessary to declare that L is a predicate. L can also be thought of as a boolean variable.

In order to find a counter-example, the theorem prover tests for failures of the subcomponent L==>P. For this purpose, it is instructive to consider the truth table for the "implies" operator. The only circumstance under which L==>P is false is when L is true and P is false, i.e., L $\neg\wedge$P. (The situation where L is false implies nothing at all about P.) For the theorem prover to construct a counter-example, that counter-example must contain L=True. Accordingly, the theorem prover attempts to refute the VC by inventing assignments to predicates and variables so that L is found to be true, but P is false and, hence, the entire VC is false. The theorem prover is not constrained by the values it can assign to L because L is a fresh variable. Furthermore, any counter-example now produced by the theorem prover includes L.

In accordance with the present invention, at least one label L inserted in a program is a flow control label and is associated with a particular conditional branch direction (e.g., the "THEN" or "ELSE" branch of an IF statement). The inclusion of the label L in the counter-example allows the user to determine the execution path of the program associated with the counter-example because the presence of the label in the counter-example indicates which branch direction was taken to arrive at the program state that violates a sub-condition of the VC for the program.

Case 2: L=k==>P

In the second case, L is not a predicate but takes the role of a term and k is a constant. For example, L may be an integer variable and k may be a particular integer value, such as 17. Thus, in a similar manner to the above, a subcomponent of the formula can also be replaced by an expression of the form L=k==>P in the VC. The reason for distinguishing the type of L in the first and second cases is that some theorem provers do not permit arbitrary names to be assigned to predicates, so L must be an integer variable. In general, a theorem prover may act differently on a predicate than on an integer variable.

As with the previous case, when the theorem prover finds a counter-example, it is such that the left hand side of the implies statement is true and the right hand side is false. In the above example, the left hand side of the implies statement is true if L=17. Accordingly, if the theorem prover finds a counter-example, within that counter example it can be found that L=17.

Ideally, a mechanism should be employed to prevent the theorem prover from producing counter-examples in which conditions such as L=17 (or L=True for Case 1, above) are printed but where such conditions are irrelevant. For example, when the theorem prover is working on an expression R that has not been labeled with L, if a situation is found in which R is false, then this situation holds whatever the value of L. If the theorem prover printed out L=17 in these circumstances, the output would be confusing. Accordingly, appropriate heuristic mechanisms are employed to ensure that labels such as L are only printed out when applicable to the subcomponents in question. In particular, these heuristic mechanisms prevent the label L from being included in a counter-example when the truth or falsity of the sub-condition associated with the label is not relevant to the counter-example. Stated another way, if the part of the VC where the label is located is the part which the theorem prover has been unable to prove, then the label will normally be included in the counter-example.

The first and second cases therefore show how a label associated with a particular subcomponent of a program can be caused to be included in a verification condition. An alternate embodiment can be envisaged in which L is assigned to a string variable instead of a boolean or an integer variable.

Case 3: LBLNEG and LBLPOS

Logically, a statement such as L=5=>P is equivalent to $\neg$L $\vee$ P. Because of this equivalence, a theorem prover normally has to consider two possible routes through the program separately. Where there are many such branches, the situation can become complex. For example, n branches leads to $2^n$ possible routes. In this context, the LBLPOS and LBLNEG constructs can both be utilized in flow control labels within the VC so that program or execution trace information can be revealed. When the VC contains flow control labels in subexpressions of the VC, using the LBLPOS and LBLNEG constructs, the counter-examples produced by the theorem prover also contain flow control labels. The LBLPOS and LBLNEG constructs can be wielded in a number of different ways, depending upon context.

In order to generate program trace information, a flow control label is inserted into conditional branch instructions in the program by the verification condition generator. Only conditional branch points of the program need to be labeled with flow control labels. This is because the sequence of branches that a program takes is the information needed to follow the sequence of events in a counter-example that illustrates an error or potential error condition. However, it may be helpful to label additional program statements as well to produce more complete program flow information and thus easier to understand counter-examples.

In general, a LBLPOS flow control label is included in the output produced by the theorem prover if the condition associated with the label is true in and relevant to the counter-example. A LBLNEG flow control label is included in the output produced by the theorem prover if the condition associated with the label is false in and relevant to the counter-example.

The context of each LBLNEG or LBLPOS—flow control label has the form {LBLNEG label condition} or {LBLPOS label condition}. In a preferred embodiment, the "label" identifies the line number of the instruction and the line position of the instruction operand or operator such as "then" or "else" that is the subject of the program condition, and the "condition" specifies the program condition to be applied and the variable or other instruction element to which it is to be applied or can be "true" or "false".

By way of illustration, if
(LBLNEG K Q)

is inserted into the verification condition, where K is a label and Q is a condition within the verification condition, if condition Q is included in the counter-example produced by the theorem prover and is false (i.e., negative), the label K is included in the representation of the counter-example.

Next, let us consider a condition P of a verification condition that is annotated using the label "LBLPOS L",
(LBLPOS L P).

where P can be true or false, depending upon context. If P is a predicate or other part of a counter-example produced by the theorem prover and true (i.e., is positive), the label L is included in the representation of the counter-example.

A further illustration of LBLPOS is as follows:
(LBLPOS L True)

In this case, the condition P is replaced by True. Since True can always be made to be a part of any counter-example, label L would theoretically be produced with every counter-example, a result that would not be particularly useful. Instead, heuristics are used so that L is only produced where condition P is in the part of the VC identified by the theorem prover as potentially containing an error.

It is noted that a logical equivalent of (LBLPOS L P) is ¬(LBLNEG L ¬P). Uses of the LBLNEG and LBLPOS constructs are further illustrated and described in the Example, below.

Case 4: (LBLPOS L true)==>P

A further use of LBLPOS and LBLNEG is mathematically equivalent to the previous case. In general, the best way to attach a name to a portion of a verification condition may depend on the particular theorem prover used, and is not limited to the four examples given above.

In one embodiment of the present invention, flow control labels are assigned to a program prior to converting the annotated program to guarded command form. In another embodiment, flow control labels are assigned while converting the annotated program to guarded command form.

Ultimately, the LBLNEG and LBLPOS constructs serve as flags to alert the theorem prover that what immediately follows is a label name. In a preferred embodiment, each label name indicates the position in the source program of the subcomponent to which the label applies. In one embodiment, all labels begin with "trace.", for ease of recognition. A further component of the label name can be "then" to denote that an IF branch of a choice control structure was taken, or "else" to denote that an ELSE branch was taken. A label name can also optionally contain one or more separators such as "^". In a preferred embodiment, a label name contains a line and column number and, for example, a sequence number indicating the order of execution of the program statements that have been labeled. When a program contains a loop, which may be "unfolded" more than once while generating the VC, or contains a subprocedure that has been inlined more than once, the sequence number in the label name enables the user (typically a programmer) to determine which occurrence of the program statement is implicated in the error condition. An example of a label name is "trace.ElseA^2,8.11" wherein the Else instruction is found at column 11 of line 8 of the annotated program and is the third instruction in the program to have a flow control label. An alternative naming scheme can be envisaged in which labels L are assigned a characteristic set of characters, e.g., "XX" followed by a number, in sequence, e.g., 1708. An accompanying table serves to correlate the variable names with their respective positions in the annotated program.

In a preferred embodiment, when presenting a counter example, the label names of statements implicated in the error condition are presented in the order dictated by their sequence numbers ("sequence number order").

Names appearing in a counter-example are extracted by the post-processor 130. In turning these extracted names into a program trace for the warning message, the post-processor uses the recorded association between the name and the subcomponent of the design. For applications of the invention where the actions or steps in execution traces are ordered, the order of the associated subcomponents can be used to sort the reconstructed parts of the execution trace.

EXAMPLE

Operation of a Preferred Embodiment

Operation of a preferred embodiment of the present invention will be explained through an example, shown here in Tables 1 through 13.

Table 1 shows an example of a Java program that is to be checked by the verification condition static checking module 120 (program verifier).

TABLE 1

An example Java program, T.java used as input to the Verification Condition Static Checking Module. Line numbers are shown at the left hand side, beginning at line 1, and column numbers, beginning at column 0, in groups of 10 are shown at the top.

```
       0123456789012345678901234567890123456789
1      class T {
2        static int x;
3
4        static void m(int[] a, int[] b) {
5          int[] c;
6          if (a != null) {
7            c = a;
8          } else {
9            c = b;
10         }
11         x = c.length;
  12       }
    13   }
```

In the Java program illustrated in Table 1, line 11 can only execute if c is not null. Accordingly, an appropriate check for the theorem prover is to establish whether c could ever be null and to produce a counter-example with a program or execution trace that shows how line 11 could be caused to execute with c null.

It can be seen that variable c is assigned in lines 11 and 13, in both branches of an if . . . then . . . else control structure. Execution of one of these branches gives rise to a potential error at line 11. It is an object of the present invention to show which of those branches is responsible.

Tables 2–6 represent an example of the operation of a program verifier that does not use the present invention. The operation of such a program will be contrasted with the operation of the present invention, as shown in Tables 7–13.

Table 2 shows the output generated by a program verifier module that does not utilize the present invention. A potential null dereferencing error is identified, but the error message does not provide an execution trace to indicate how the object reference "c.length" could have a null value.

TABLE 2

Output from prior art program verifier when applied to the program of Table 1

T.java:11: Warning: Possible null dereference (Null)
   x = c.length;
       ^
1 warning The program verifier first produces an intermediate language representation of the program. In this example, the intermediate representation is in guarded command language, shown in Table 3.

TABLE 3

An intermediate-language program produced from the Program in Table 1, without applying the present invention

```
1    ASSUME boolAnd(is(a:4.22, type(int[])), isAllocated(a:4.22, alloc));
2    ASSUME boolAnd(is(b:4.31, type(int[])), isAllocated(b:4.31, alloc));
3    VAR int[] a@pre:4.22; int[] b@pre:4.31 IN
4      a@pre:4.22 = a:4.22;
5      b@pre:4.31 = b:4.31;
6      {  VAR int[] c:5.10 IN
7         {  ASSUME refNE(a:4.22, null);
8            c:5.10 = a:4.22
9         []
```

TABLE 3-continued

An intermediate-language program produced from the Program in Table 1, without applying the present invention

```
10         ASSUME boolNot(refNE(a:4.22, null));
11         c:5.10 = b:4.31
12       };
13       ASSERT (LBLNEG Null@11.9 refNE(c:5.10, null));
14       x:2.13 = arrayLength(c:5.10)
15    END;
16    EC = ecReturn
17  !  SKIP
18  };
19  RESTORE a:4.22 FROM a@pre:4.22;
20  RESTORE b:4.31 FROM b@pre:4.31
21 END;
22 ASSERT (LBLNEG Exception:4.14@12.2 anyEQ(EC, ecReturn))
```

For every proof obligation, an ASSERT statement is introduced into the intermediate language form. The ASSERT statement also eventually makes it into the VC.

The ASSERT statement at line 13 of Table 3 denotes a condition that needs to be proved, i.e., must hold for the program to correctly execute. Such an assert is ordinarily automatically inserted for any dereference operation. The use of LBLNEG here is so that the theorem prover will report the label if the condition that follows is false in the counter-example. (Thus this use of the LBLNEG construct is not as part of a flow control label.) The term "Null@11.9" in the same line denotes a check for a null dereference at line 11, column 9 of the original program. The '@' symbol is used in labels as a symbol that the post-processor can find easily. A notation like this makes it easier for the theorem prover to parse the guarded command form and identify potential problems for illustration in the counter-examples. In Table 3, the term "refNE" means reference not equal. In line 13 of Table 3, the refE operator refers to variable c and null. Variable c is identified as "c:5.10" to denote that it is the variable that is declared at line 5, column 10 of the original program in Table 1.

The guarded command representation is, in turn, converted into the logical equation, called the verification condition, shown in Table 4. The verification condition includes many sub-equations. When any of these sub-equations can be evaluated to a value that causes the verification condition to be false, that situation represents an error or potential error (or a failure or weakness of the theorem prover). Each such sub-equation is identified as a counter-example, an example of which is shown in Table 5.

TABLE 4

The verification condition produced from the intermediate-language program of Table 3.

```
1    (IMPLIES
2     (AND (DISTINCT |ecReturn|))
3     (LBLNEG
4      |vc.T.m.4.2|
5      (IMPLIES
6       (AND
7        (EQ |x@pre:2.13| |x:2.13|)
8        (EQ |@true| (is |x:2.13| |T__int|))
9        (EQ |elems@pre| elems)
10       (EQ elems (asElems elems))
11       (< (eClosedTime elems) alloc)
12       (EQ LS (asLockSet LS))
13       (EQ |alloc@pre| alloc)
14       (EQ |@true| (is |a:4.22| (array |T__int|)))
15       (EQ |@true| (isAllocated |a:4.22| alloc))
16       (EQ |@true| (is |b:4.31| (array |T__int|)))
17       (EQ |@true| (isAllocated |b:4.31| alloc)))
18      (FORALL
19       (|a@pre:4.22| |b@pre:4.31| |c:5.10|)
20       (AND
21        (IMPLIES
22         (NEQ |a:4.22| null)
23         (AND
24          (LBLNEG |Null@11.9| (NEQ |a:4.22| null))
25          (FORALL
26           (|x:11.4|)
27           (IMPLIES
28            (EQ |x:11.4| (arrayLength |a:4.22|))
29            (LBLNEG |Exception:4.14@12.2| (EQ |ecReturn| |ecReturn|
                                                                     ))))))
30         (IMPLIES
31          (NOT (NEQ |a:4.22| |null|))
32          (AND
33           (LBLNEG |Null@11.9| (NEQ |b:4.31| null))
34           (FORALL
35            (|x:11.4|)
36            (IMPLIES
37             (EQ |x:11.4| (arrayLength |b:4.31|))
38             (LBLNEG |Exception:4.14@12.2| (EQ |ecReturn|
                                                             |ecReturn|)))))))))))
```

In Table 4, the occurrence of the potential null dereference at line 11, column 9 of the original annotated program is indicated by the LBLNEG in two places, lines 24 and 33. Each of these two places corresponds to one of the two possible branches in the original program. The difficulty is that neither of these labels, when included in the counter-example output produced by the theorem prover, gives an indication of how the program progressed prior to encountering the error condition.

TABLE 5

Output of Theorem Prover
(based on input of Table 4 and the context axioms associated with the program of Table 1)

```
Counter-example labels (|vc.T.m.4.2| |Null@11.9|)
counter-example context
    (AND
      TRUE
      (<= |x:2.13| intLast)
      (<= intFirst |x:2.13|)
      (< (eClosedTime |elems@pre|) |alloc@pre|)
```

TABLE 5-continued

Output of Theorem Prover
(based on input of Table 4 and the context axioms associated with the program of Table 1)

```
. . .
    (EQ |a:4.22| null)
    (EQ |b:4.31| null)
    (EQ |elems@pre| elems)
    (EQ |x@pre:2.13| |x:2.13|)
    (NEQ |bool$false| |@true|)
)
```

It is from this counter-example (in particular, the labels shown in the first line of the counter-example) that the program verifier produces the error message shown in Table 2. Table 5 purposefully omits some portions of the counter-example context that are not relevant to this explanation.

By contrast, Tables 6, 7, 9, and 11 represent an example of the operation of a program verifier that uses the present invention.

Table 6 shows the output generated by a program verifier module that utilizes the present invention. A potential null dereferencing error is identified, along with a program trace that indicates how the object reference "c.length" could have a null value.

TABLE 6

Output from the Program Verifier of the present invention
(based on program of Table 1, applying the present invention)

```
T.java:11: Warning: Possible null dereference (Null)
    x = c.length;
Execution trace information:
    Executed else branch in "T.java", line 8, col 11.
1 warning
```

The program verifier of the present invention produces an intermediate language representation of the program, shown in Table 7.

Table 7 again uses the guarded command form. Note that this time, in contrast to Table 3, the intermediate language representation of the program includes flow control labels that identify the line and position of the "then" and "else" instruction elements in the program as can be seen at lines 8 and 12 of Table 7 where LBLPOS flow control labels are printed. Note that the names of the labels include line and column numbers that represent the positions in the program at which they apply. The way in which LBLPOS flow control labels have been used in this example is that of Case 4, discussed above. The format of the flow control labels in this example is {LBLPOS Label True}. The names of the labels are respectively characteristic of the "then" and "else" branch.

Table 8 shows the differences between the two intermediate language representations of Tables 3 and 7 to highlight the difference between the verification system of the prior art and the present invention. The version of the verifier module that utilizes the present invention inserts flow control labels in lines 8 and 12 of the intermediate language representation.

TABLE 7

The intermediate-language program produced from the program in Table 1 by the
verification condition generator, applying the present invention.

```
1   ASSUME boolAnd(is(a:4.22, type(int[])), isAllocated(a:4.22, alloc));
2   ASSUME boolAnd(is(b:4.31, type(int[])), isAllocated(b:4.31, alloc));
3   VAR int[] a@pre:4.22; int[] b@pre:4.31 IN
4       a@pre:4.22 = a:4.22;
5       b@pre:4.31 = b:4.31;
6       {   VAR int[] c:5.10 IN
7           {   ASSUME refNE(a:4.22, null);
8               ASSUME (LBLPOS trace.Then^0,6.19 true);
9               c:5.10 = a:4.22
10          []
11              ASSUME boolNot(refNE(a:4.22, null));
12              ASSUME (LBLPOS trace.Else^1,8.11 true);
13              c:5.10 = b:4.31
14          };
15          ASSERT (LBLNEG Null@11.9 refNE(c:5.10, null));
16          x:2.13 = arrayLength(c:5.10)
17          END;
18          EC = ecReturn
19      !   SKIP
20      };
21      RESTORE a:4.22 FROM a@pre:4.22;
22      RESTORE b:4.31 FROM b@pre:4.31
23  END;
24  ASSERT (LBLNEG Exception:4.14@12.2 anyEQ(EC, ecReturn))
```

TABLE 8

The differences between Tables 3 and 7

The following two lines of Table 7 are not present in Table 3:
    Line 8:
        ASSUME (LBLPOS trace.Then^0,6.19 true);
    Line 12:
        ASSUME (LBLPOS trace.Else^1,8.11 true);
There are no other differences.

The intermediate language representation of the program is converted into the logical equation, called the verification condition, shown in Table 9.

TABLE 9

The verification condition produced from the intermediate-language program of Table 7

```
1    (IMPLIES
2     (AND (DISTINCT |ecReturn|))
3     (LBLNEG
4      |vc.T.m.4.2|
5      (IMPLIES
6       (AND
7        (EQ |x@pre:2.13| |x:2.13|)
8        (EQ |@true| (is |x:2.13| |T__int|))
9        (EQ |elems@pre| elems)
10       (EQ elems (asElems elems))
11       (< (eClosedTime elems) alloc)
12       (EQ LS (asLockSet LS))
13       (EQ |alloc@pre| alloc)
14       (EQ |@true| (is |a:4.22| (array |T__int|)))
15       (EQ |@true| (isAllocated |a:4.22| alloc))
16       (EQ |@true| (is |b:4.31| (array |T__int|)))
17       (EQ |@true| (isAllocated |b:4.31| alloc)))
18       (FORALL
19        (|a@pre:4.22| |b@pre:4.31| |c:5.10|)
20        (AND
21         (IMPLIES
22          (AND (NEQ |a:4.22| null) (LBLPOS |trace.Then^0,6.19| TRUE))
23          (AND (LBLNEG |Null@11.9| (NEQ |a:4.22| null))
24           (FORALL
25            (|x:11.4|)
26            (IMPLIES
27             (EQ |x:11.4| (arrayLength |a:4.22|))
28             (LBLNEG |Exception:4.14@12.2| (EQ |ecReturn| ecReturn|))))))
29         (IMPLIES
30          (AND (NOT (NEQ |a:4.22| null)) (LBLPOS |trace.Else^1,8.11| TRUE))
31          (AND (LBLNEG |Null@11.9| (NEQ |b:4.31| null))
32           (FORALL
33            (|x:11.4|)
34            (IMPLIES
35             (EQ |x:11.4| (arrayLength |b:4.31|))
36             (LBLNEG |Exception:4.14@12.2| (EQ |ecReturn| |ecReturn|
37    )))))))))))
```

This Table shows also the two occurrences of LBLNEG, at lines 23 and 31, corresponding to the check for a null dereference at line 11 of the original program. The two occurrences of LBLPOS, corresponding to the "then" and "else" branches of the original program are also shown in table 9, at lines 22 and 30, respectively. Both occurrences of LBLPOS are found within an IMPLIES context, expressed in table 9 in the 'prefix' notation, i.e., "x==>y" is written as (IMPLIES (x)(y)). For example, the literal expression of lines 21–23 is:

$$((a \neq NULL) \wedge (LBLPOS\ trace.Then^0,6.19\ TRUE))$$
$$==> ((LBLNEG\ Null@11.9(a \neq NULL)) \wedge \ldots)$$

Therefore, the verification condition in Table 9 includes expressions that contain both the LBLNEG labels for the null-dereferenced variable and the LBLPOS labels that indicate the sides of the branches. This verification condition is a precursor to a more informative presentation in which the position of the null-dereference is connected explicitly to an execution path through the program.

Table 10 shows the differences between the verification conditions shown in Tables 4 and 9. The verification condition generated by the version of the verifier module that utilizes the present invention includes flow control labels in lines 22 and 30 of the verification condition.

TABLE 10

The differences between Tables 4 and 9

Line 22 of Table 4:
    (NEQ |a:4.22| null)
is replaced in Table 9 by line 22:
    (AND (NEQ |a:4.22| null) (LBLPOS |trace.Then^0,6.19| TRUE))
Line 31 of Table 4:
    (NOT (NEQ |a:4.22| null))
is replaced in Table 9 by line 30:
    (AND (NOT (NEQ |a:4.22| null)) (LBLPOS |trace.Else^1,8.11| TRUE))
There are no other differences.

The verification condition shown in Table 9 includes many sub-equations, two of which are labeled with flow control labels. When any of these sub-equations can be evaluated to a value that causes the verification condition to be false, that represents an error or potential error (or a failure or weakness of the theorem prover). Each such sub-equation is identified as a counter-example, an example of which is shown in Table 11.

TABLE 11

Theorem Prover Output
(based on verification condition of TABLE 9 and the context
axioms associated with the program of TABLE 1)

Counter-example labels (|vc.T.m.4.2| |trace.Else ^ 1,8.11|
                             |Null@11.9|)
counter-example context
    (AND
        TRUE
        (<= |x:2.13| intLast)
        (<= intFirst |x:2.13|)
        (< (eClosedTime |elems@pre|) |alloc@pre|)
        ...
        (EQ |a:4.22| null)
        (EQ |b:4.31| null)
        (EQ |elems@pre| elems)
        (EQ |x@pre:2.13| |x:2.13|)
        (NEQ |bool$false| |@true|)
    )

It is from this counter-example (in particular, the labels shown in the first line of the counter-example) that the program verifier produces the error message shown in Table 6. So, here, the label "trace. Else^1,8.11" indicates that an execution trace is contemplated and that a branch point encountered prior to the potential error was the "else" branch of line 8. The label "Null@11.9" describes the source of the error as being a null dereference at line 11, column 9.

Table 11 does not include some portions of the counter-example context that are not relevant to this explanation.

Tables 12 and 13 contain simplified versions of Tables 7 and 9, respectively, that make it easier to see the relationship between the portions of the program in which flow control statements have been inserted and the corresponding portions of the verification condition. Lines 5 and 9 of Table 12, which contain flow control labels (LBLPOS), are the ones introduced by the present invention.

TABLE 12

Simplified Version of TABLE 7

| | |
|---|---|
| 1 | ASSUME is (a:4.22, type(int[])); |
| 2 | ASSUME is (b:4.31, type(int[])); |
| 3 | VAR int[] c:5.10 IN |
| 4 |   { ASSUME refNE (a:4.22, null); |
| 5 |     ASSUME (LBLPOS trace.Then ^ 0,6.19 true); |
| 6 |     c:5.10 = a:4.22 |
| 7 |   [] |
| 8 |     ASSUME boolNot (refNE (a:4.22, null)); |
| 9 |     ASSUME (LBLPOS trace.Else ^ 1,8.11 true); |
| 10 |     c:5.10 = b:4.31 |
| 11 |   }; |
| 12 | ASSERT (LBLNEG Null@11.9 refNE (c:5.10, null)); |
| 13 | x:2.13 = arrayLength (c:5.10) |
| 14 | END |

Note that this simplified version of Table 7 shown in Table 12 is only for the purpose of explaining Table 7 and draws attention to the parts that are of interest for understanding the present invention.

TABLE 13

Simplified Version of TABLE 9

| | |
|---|---|
| 1 | (LBLNEG |
| 2 |   |vc.T.m.4.2| |
| 3 |   (IMPLIES |
| 4 |     (AND |
| 5 |       (EQ |@true| (is |x:2.13| |T__int|)) |
| 6 |       (EQ |@true| (is |a:4.22| (array |T__int|))) |
| 7 |       (EQ |@true| (is |b:4.31| (array |T__int|)))) |
| 8 |     (FORALL |
| 9 |       (|c:5.10|) |
| 10 |       (AND |
| 11 |         (IMPLIES |
| 12 |           (AND (NEQ |a:4.22| null) (LBLPOS |trace.Then ^ 0,6.19| TRUE)) |
| 13 |           (LBLNEG |Null@11.9| (NEQ |a:4.22| null))) |
| 14 |         (IMPLIES |

TABLE 13-continued

Simplified Version of TABLE 9

| | |
|---|---|
| 15 | (AND (NOT (NEQ |a:4.22| null)) (LBLPOS trace.Else ˆ |8,11| TRUE)) |
| 16 | (LBLNEG |Null@11.9| (NEQ |b:4.31| null)))))) |

Note that Table 13 is a simplified version of Table 9, only for the purpose of explaining Table 9, drawing attention to the parts that are of interest for understanding the invention.

Alternate Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of verifying with static checking whether a specified computer program satisfies a predefined set of conditions, comprising:
   converting the program into a logical equation representing the predefined set of conditions as applied to instructions and elements of the instructions of the program, the converting step including inserting flow control labels into the sub-equations of the logical equation, the flow control labels identifying conditional branch points in the specified computer program;
   applying a theorem prover to the logical equation to determine the truth of the logical equation, and when the truth of the logical equation cannot be proved, generating at least one counter-example identifying one of the conditions, one or more variable values inconsistent with the one condition, and any of the flow control labels for conditional branch points of the program associated with the identified variable values; and
   converting the at least one counter-example into an error message that includes a program trace that identifies a path through the computer program when the counter-example identifies one or more of the flow control labels.

2. The method of claim 1 wherein the converting step additionally comprises a step of converting the program into an intermediate language form prior to creating the logical equation.

3. The method of claim 2 wherein the flow control labels are inserted before converting the program into the intermediate language form.

4. The method of claim 2 wherein the flow control labels are inserted after converting the program into the intermediate language form.

5. The method of claim 2 wherein the intermediate language form is Dijkstra's guarded command language.

6. The method of claim 1 wherein at least one of the flow control labels includes a flow control label name that includes a string that identifies a type of branch in the program and a line number in the specified computer program.

7. The method of claim 1 wherein at least one of the flow control labels includes a flow control label name that includes a value associated with an entry in a table that identifies a type of branch in the program and a line number in the specified computer program.

8. The method of claim 1 wherein at least one of the flow control labels is of the form L==>P wherein L is a flow control label name and P is a subcomponent of the logical equation.

9. The method of claim 8 wherein the flow control label name comprises a string that identifies a type of branch in the program and a line number in the specified computer program.

10. The method of claim 8 wherein the flow control label name includes a value associated with an entry in a table that identifies a type of branch in the program and a line number in the specified computer program.

11. The method of claim 1 wherein at least one of the flow control labels is of the form L=K==>P wherein L is a flow control label name, k is a constant value and P is a subcomponent of the logical equation.

12. The method of claim 11 wherein the flow control label name comprises a string that identifies a type of branch in the program and a line number in the specified computer program.

13. The method of claim 11 wherein the flow control label name includes a value associated with an entry in a table that identifies a type of branch in the program and a line number in the specified computer program.

14. The method of claim 1 wherein at least one of the flow control labels is of the form {LBLPOS L P} wherein L is a flow control label name and P is a subcomponent of the logical equation.

15. The method of claim 14 wherein the flow control label name comprises a string that identifies a type of branch in the program and a line number in the specified computer program.

16. The method of claim 14 wherein the flow control label name includes a value associated with an entry in a table that identifies a type of branch in the program and a line number in the specified computer program.

17. The method of claim 1 wherein at least one of the flow control labels is of the form ⊐{LBLNEG L ⊐P} wherein L is a flow control label name and P is a subcomponent of the logical equation.

18. The method of claim 17 wherein the flow control label name comprises a string that identifies a type of branch in the program and a line number in the specified computer program.

19. The method of claim 17 wherein the flow control label name includes a value associated with an entry in a table that identifies a type of branch in the program and a line number in the specified computer program.

20. The method of claim 1 wherein at least one of the flow control labels is of the form {LBLPOS L True}==>P wherein L is a flow control label name and P is a subcomponent of the logical equation.

21. The method of claim 20 wherein the flow control label name comprises a string that identifies a type of branch in the program and a line number in the specified computer program.

22. The method of claim 1 wherein the flow control label name identifies a line number in the specified computer program at which an associated program instruction is located and includes a sequence number indicating an order of execution of the program instruction at the identified line number relative to other program instructions identified by other flow control labels.

23. A computer program product for use in static checking in conjunction with a computer system, the computer program product comprising a computer readable storage medium and a computer program mechanism embedded therein, the computer program mechanism comprising:
a verification condition generator that converts a specified program into a logical equation representing the predefined set of conditions as applied to instructions and elements of the instructions of the program, the verification condition generator including instructions that insert flow control labels into the sub-equations of the logical equation, the flow control labels identifying conditional branch points in the specified computer program;
a theorem prover that processes the logical equation to determine the truth of the logical equation, and when the truth of the logical equation cannot be proved, generates at least one counter-example identifying one of the conditions, one or more variable values inconsistent with the one condition, and any of the flow control labels for conditional branch points of the program associated with the identified variable values; and
a post processing module that converts the at least one counter-example into an error message that includes a program trace that identifies a path through the computer program when the counter-example identifies one or more of the flow control labels.

24. The computer program product of claim 23 wherein the verification condition generator includes instructions for converting the program into an intermediate language form prior to creating the logical equation.

25. The computer program product of claim 24 wherein the verification condition generator includes instructions for inserting the flow control labels before converting the program into the intermediate language form.

26. The computer program product of claim 24 wherein the verification condition generator includes instructions for inserting the flow control labels after converting the program into the intermediate language form.

27. The computer program product of claim 24 wherein the intermediate language form is Dijkstra's guarded command language.

28. The computer program product of claim 23 wherein at least one of the flow control labels includes a flow control label name that includes a string that identifies a type of branch in the program and a line number in the specified computer program.

29. The computer program product of claim 23 wherein at least one of the flow control labels includes a flow control label name that includes a value associated with an entry in a table that identifies a type of branch in the program and a line number in the specified computer program.

30. The computer program productof claim 23 wherein at least one of the flow control labels is of the form L==>P wherein L is a flow control label name and P is a subcomponent of the logical equation.

31. The computer program product of claim 30 wherein the flow control label name comprises a string that identifies a type of branch in the program and a line number in the specified computer program.

32. The computer program product of claim 30 wherein the flow control label name includes a value associated with an entry in a table that identifies a type of branch in the program and a line number in the specified computer program.

33. The computer program product of claim 23 wherein at least one of the flow control labels is of the form L=k==>P wherein L is a flow control label name, k is a constant value and P is a subcomponent of the logical equation.

34. The computer program product of claim 23 wherein names of the flow control labels comprise a string that identifies a type of branch in the program and a line number in the specified computer program.

35. The computer program product of claim 23 wherein names of the flow control labels include a value associated with an entry in a table that identifies a type of branch in the program and a line number in the specified computer program.

36. The computer program product of claim 23 wherein at least one of the flow control labels is of the form {LBLPOS L P} wherein L is a flow control label name and P is a subcomponent of the logical equation.

37. The computer program product of claim 36 wherein the flow control label name comprises a string that identifies a type of branch in the program and a line number in the specified computer program.

38. The computer program product of claim 36 wherein the flow control label name includes a value associated with an entry in a table that identifies a type of branch in the program and a line number in the specified computer program.

39. The computer program product of claim 23 wherein at least one of the flow control labels is of the form $\neg${LBLNEG L $\neg$P} wherein L is a flow control label name and P is a subcomponent of the logical equation.

40. The computer program product of claim 39 wherein the flow control label name comprises a string that identifies a type of branch in the program and a line number in the specified computer program.

41. The computer program product of claim 39 wherein the flow control label name includes a value associated with an entry in a table that identifies a type of branch in the program and a line number in the specified computer program.

42. The computer program product of claim 23 wherein at least one of the flow control labels is of the form {LBLPOS L True}==>P wherein L is a flow control label name and P is a subcomponent of the logical equation.

43. The computer program product of claim 42 wherein the flow control label name comprises a string that identifies a type of branch in the program and a line number in the specified computer program.

44. The computer program product of claim 42 wherein the flow control label name includes a value associated with an entry in a table that identifies a type of branch in the specified computer program and a line number in the specified computer program.

45. The computer program product of claim 23 wherein the flow control label name identifies a line number in the specified computer program at which an associated program instruction is located and includes a sequence number indicating an order of execution of the program instruction at the identified line number relative to other program instructions identified by other flow control labels.

46. The method of claim 20 wherein the flow control label name includes a value associated with an entry in a table that identifies a type of branch in the specified computer program and a line number in the specified computer program.

47. A method, comprising:
   converting a computer program into a logical equation representing a predefined set of conditions;
   inserting flow control labels into sub-equations of the logical equation, the flow control labels identifying branch points in the computer program, wherein at least one of the flow control labels is of a form selected from the group consisting of (1) L==>P wherein L is a flow control label name and P is a subcomponent of the logical equation, (2) L=K==>P wherein L is a flow control label name, k is a constant value and P is a subcomponent of the logical equation, (3) {LBLPOS L P} wherein L is a flow control label name and P is a subcomponent of the logical equation, (4) ¬{LBLNEG L ¬P} wherein L is a flow control label name and P is a subcomponent of the logical equation, and (5) {LBLPOS L True}==>P wherein L is a flow control label name and P is a subcomponent of the logical equation;
   applying a theorem prover to the logical equation to determine a truth of the logical equation, and when the truth of the logical equation cannot be proved, generating at least one counter-example identifying one of the conditions; and
   converting the at least one counter-example into an error message that comprises a program trace that identifies a path through the computer program when the counter-example identifies one or more of the flow control labels.

* * * * *

UNITED STATES PATENT AND TRADEMARK OFFICE
CERTIFICATE OF CORRECTION

PATENT NO.        : 7,024,661 B2
APPLICATION NO.   : 09/754890
DATED             : April 4, 2006
INVENTOR(S)       : K. Rustan M. Leino et al.

It is certified that error appears in the above-identified patent and that said Letters Patent is hereby corrected as shown below:

In column 7, line 64, delete "L¬∧P." and insert -- L∧¬P. --, therefor.

In column 8, line 65, delete "L=5=>P" and insert -- L==>P --, therefor.

In column 10, line 34, delete "trace.ElseA^2,8.11" and insert -- trace.Else^2,8.11 --, therefor.

In column 12, line 67, delete "refE" and insert -- refNE --, therefor.

In column 14, table 4, line 31, delete "(NOT (NEQ |a:4.22| |null))" and insert -- (NOT (NEQ |a:4.22| null)) --. therefor.

In column 17, table 9, line 14, delete "(array T_int|)))" and insert -- (array |T_ int|))) --, therefor.

In column 17, table 9, line 28, delete "(EQ |ecReturn| ecReturn|))))))" and insert -- (EQ |ecReturn| |ecReturn|)))))) --, therefor.

In column 21, table 13, line 15, delete "(LBLPOS trace.Else^1,8.11| TRUE))" and insert -- (LBLPOS |trace.Else^l,8.11| TRUE)) --, therefor.

In column 22, line 65, in Claim 17, delete "¬{LBLNEG L ¬P} and insert -- ¬{LBLNEG L ¬P} --, therefor.

UNITED STATES PATENT AND TRADEMARK OFFICE
CERTIFICATE OF CORRECTION

| | |
|---|---|
| PATENT NO. | : 7,024,661 B2 |
| APPLICATION NO. | : 09/754890 |
| DATED | : April 4, 2006 |
| INVENTOR(S) | : K. Rustan M. Leino et al. |

It is certified that error appears in the above-identified patent and that said Letters Patent is hereby corrected as shown below:

In column 24, line 11, in Claim 30, delete "productof" and insert -- product of --, therefor.

Signed and Sealed this

Twenty-fourth Day of March, 2009

JOHN DOLL
*Acting Director of the United States Patent and Trademark Office*